(12) United States Patent
Kang et al.

(10) Patent No.: US 12,464,125 B2
(45) Date of Patent: Nov. 4, 2025

(54) METHOD AND APPARATUS FOR VIDEO CODING USING DEEP LEARNING BASED IN-LOOP FILTER FOR INTER PREDICTION

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Na Young Kim, Seoul (KR); Jung Kyung Lee, Seoul (KR); Seung Wook Park, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 98 days.

(21) Appl. No.: 18/373,113

(22) Filed: Sep. 26, 2023

(65) Prior Publication Data
US 2024/0031580 A1 Jan. 25, 2024

Related U.S. Application Data

(63) Continuation of application No. PCT/KR2022/004171, filed on Mar. 24, 2022.

(30) Foreign Application Priority Data

Mar. 31, 2021 (KR) .................. 10-2021-0042090
Mar. 23, 2022 (KR) .................. 10-2022-0036249

(51) Int. Cl.
*H04N 19/59* (2014.01)
*G06T 5/20* (2006.01)
(Continued)

(52) U.S. Cl.
CPC ............ *H04N 19/124* (2014.11); *G06T 5/20* (2013.01); *G06T 5/60* (2024.01); *G06T 5/70* (2024.01);
(Continued)

(58) Field of Classification Search
CPC .. G06N 3/04; G06N 3/08; G06T 2207/20081; G06T 2207/20084; G06T 5/20; G06T 5/60; G06T 5/70; G06T 9/00; G06V 10/771
See application file for complete search history.

(56) References Cited

U.S. PATENT DOCUMENTS 9,288,485 B2  3/2016 Chono et al.
9,445,102 B2  9/2016 Schwaab et al.
(Continued)

FOREIGN PATENT DOCUMENTS

CN  110062234 A  * 7/2019  ........... H04N 19/124
KR  20130054318 A  5/2013
(Continued)

OTHER PUBLICATIONS

International Search Report and Written Opinion cited in corresponding PCT application No. PCT/KR2022/004171; Jul. 4, 2022; 11 pp.
(Continued)

*Primary Examiner* — Md N Haque
(74) *Attorney, Agent, or Firm* — Lempia Summerfield Katz LLC

(57) ABSTRACT

A method and an apparatus for video coding using a deep learning-based in-loop filter for inter-prediction are dis-
(Continued)

closed. The video coding method and the apparatus utilize a deep learning-based in-loop filter for inter-prediction of a predictive frame (P-frame) and a bipredictive frame (B-frame) in order to mitigate various levels of image distortion according to a QP (quantization parameter) value present in the P-frame and the B-frame.

15 Claims, 21 Drawing Sheets

(51) Int. Cl.
  *G06T 5/60*    (2024.01)
  *G06T 5/70*    (2024.01)
  *G06V 10/771*   (2022.01)
  *H04N 19/124*   (2014.01)
  *H04N 19/132*   (2014.01)
  *H04N 19/159*   (2014.01)

(52) U.S. Cl.
  CPC ......... *G06V 10/771* (2022.01); *H04N 19/132* (2014.11); *H04N 19/159* (2014.11)

(56) References Cited

U.S. PATENT DOCUMENTS

| | | |
|---|---|---|
| 9,601,125 B2 | 3/2017 | Atti et al. |
| 9,899,032 B2 | 2/2018 | Atti et al. |
| 11,057,627 B2 | 7/2021 | Kim et al. |
| 11,553,186 B2 | 1/2023 | Kim et al. |
| 2013/0010859 A1 | 1/2013 | Schwaab et al. |
| 2013/0121408 A1 | 5/2013 | Chono et al. |
| 2013/0208808 A1* | 8/2013 | Sasai ............... H04N 19/117 375/240.25 |
| 2014/0071233 A1* | 3/2014 | Lim ................ H04N 19/597 348/43 |
| 2014/0229172 A1 | 8/2014 | Atti et al. |
| 2017/0148460 A1 | 5/2017 | Atti et al. |
| 2019/0095795 A1* | 3/2019 | Ren .................. G06T 3/4053 |
| 2020/0029080 A1 | 1/2020 | Kim et al. |
| 2020/0374547 A1* | 11/2020 | Gao ................. H04N 19/147 |
| 2021/0250597 A1* | 8/2021 | Du .................. H04N 19/186 |
| 2021/0297675 A1 | 9/2021 | Kim et al. |
| 2022/0148130 A1* | 5/2022 | Tang ................ G06T 3/4053 |
| 2023/0106301 A1 | 4/2023 | Kim et al. |

FOREIGN PATENT DOCUMENTS

| | | |
|---|---|---|
| KR | 20190123288 A | 10/2019 |
| KR | 20190127090 A | 11/2019 |
| KR | 20210034103 A | 3/2021 |

OTHER PUBLICATIONS

Ren Yang et al., Multi-Frame Quality Enhancement for Compressed Video, 2018 IEEE/CVF Conference on Computer Vision and Pattern Recognition, arXiv:1803.04680; 2018, 10 pp.

Xu, Xiangyu, Muchen Li, and Wenxiu Sun; Learning deformable kernels for image and video denoising; arXiv preprint arXiv:1904.06903; 2019, 10 pp.

Yang, Fuzhi, et al.; Learning texture transformer network for image super-resolution; arXiv:2006.04139; 2020, 22 pp.

* cited by examiner

METHOD AND APPARATUS FOR VIDEO CODING USING DEEP LEARNING BASED IN-LOOP FILTER FOR INTER PREDICTION

CROSS-REFERENCE TO RELATED APPLICATIONS

This application is a Continuation of International Application No. PCT/KR2022/004171 filed on Mar. 24, 2022, which claims priority to Korean Patent Application No. 10-2021-0042090 filed on Mar. 31, 2021, and Korean Patent Application No. 10-2022-0036249 filed on Mar. 23, 2022, the entire disclosures of each of which are incorporated herein by reference.

TECHNICAL FIELD

The present disclosure relates to a video coding method and apparatus using a deep learning-based in-loop filter for inter-prediction.

BACKGROUND

The statements in this section merely provide background information related to the present disclosure and do not necessarily constitute prior art.

Since video data has a large amount of data compared to audio or still image data, the video data requires a lot of hardware resources, including memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Recently, deep learning-based image processing techniques have been applied to existing encoding elemental technologies. Coding efficiency can be improved by applying deep learning-based image processing techniques to existing encoding techniques, in particular, such as compression techniques as inter-prediction, intra-prediction, in-loop filter, transform, and the like. Representative application examples include inter-prediction based on virtual reference frames generated by deep learning models and include an in-loop filter based on denoising models.

In particular, since a predictive frame (P-frame) and a bipredictive frame (B-frame), even within a single video sequence, induce different levels of image distortion depending on the quantization parameter (QP) values that change from frame to frame, an in-loop filter adaptive to this situation is needed. Therefore, there is a need to provide video encoding/decoding with a deep learning-based in-loop filter applied for inter-prediction to improve the coding efficiency.

SUMMARY

The present disclosure seeks to provide a video coding method and an apparatus using a deep learning-based in-loop filter for inter-prediction of a P-frame and a B-frame in order to mitigate various levels of image distortion according to quantization parameter (QP) values present in the P-frame and the B-frame.

At least one aspect of the present disclosure provides an apparatus for video quality enhancement. The apparatus includes an input unit configured to obtain a reconstructed current frame and a decoded quantization parameter. The apparatus also includes a quantization parameter preprocessor configured to calculate an embedding vector from the quantization parameter by using an embedding function that is based on deep learning. Alternatively, the quantization parameter preprocessor is configured to estimate an image distortion due to the quantization parameter by using an estimation model that is based on deep learning. The apparatus also includes a denoiser configured to generate an enhanced frame by removing quantization noise from the current frame by using a denoising model that is based on deep learning. The denoising model utilizes the calculated embedding vector or the estimated image distortion to generate the enhanced frame.

Another aspect of the present disclosure provides a method performed by a computing device for enhancing image quality of a current frame. The method includes obtaining a reconstructed current frame and a decoded quantization parameter. The method also includes calculating an embedding vector from the quantization parameter by using an embedding function that is based on deep learning. Alternatively the method also includes estimating an image distortion due to the quantization parameter by using an estimation model that is based on deep learning. The method also includes generating an enhanced frame by removing quantization noise from the current frame by using a denoising model that is based on deep learning. Generating the enhanced frame includes causing the denoising model to utilize the calculated embedding vector or the estimated image distortion.

As described above, the present disclosure provides a video coding method and an apparatus utilizing a deep learning-based in-loop filter for inter-predicting a P-frame and a B-frame. Thus, coding efficiency is improved by mitigating various levels of image distortion according to QP values present in the P-frame and the B-frame.

DETAILED DESCRIPTION

Figure 1:
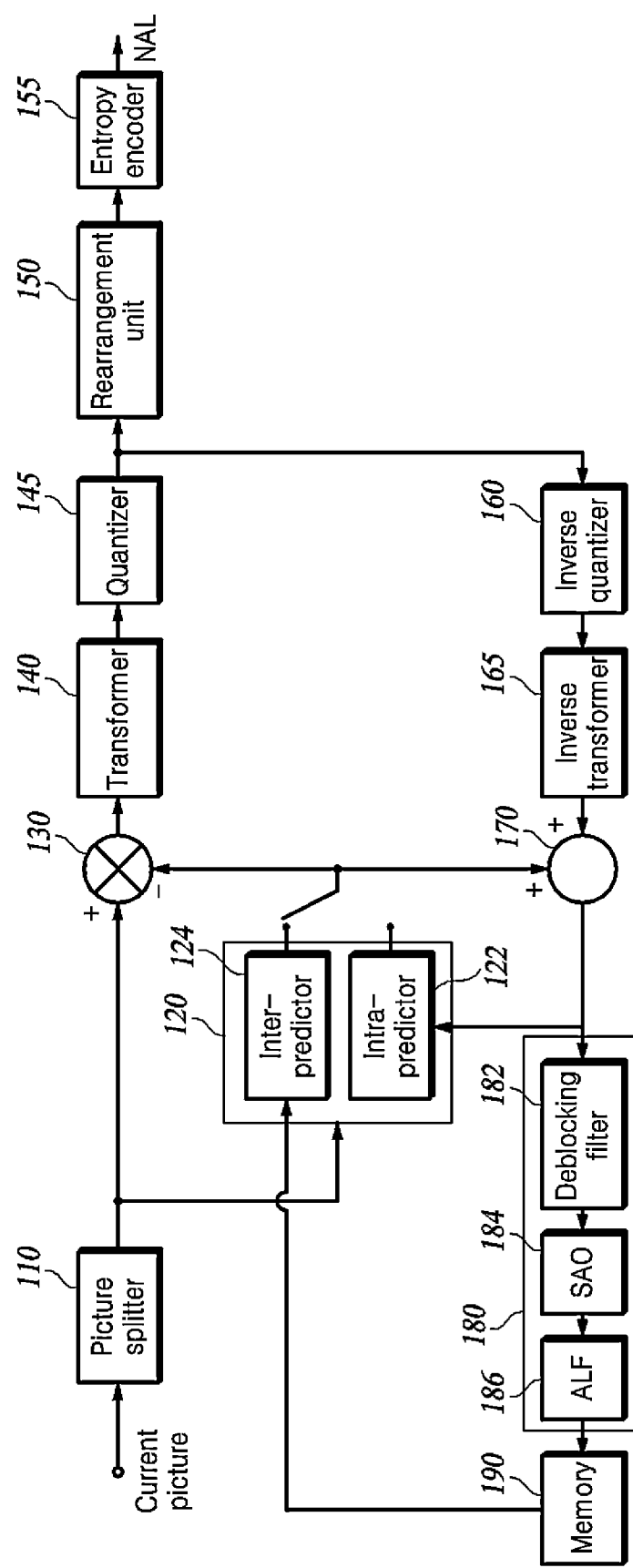
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions where considered to obscure the subject of the present disclosure have been omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a BTTT is added to the tree structures to be referred to as a multiple-type tree (MTT).

Figure 2:
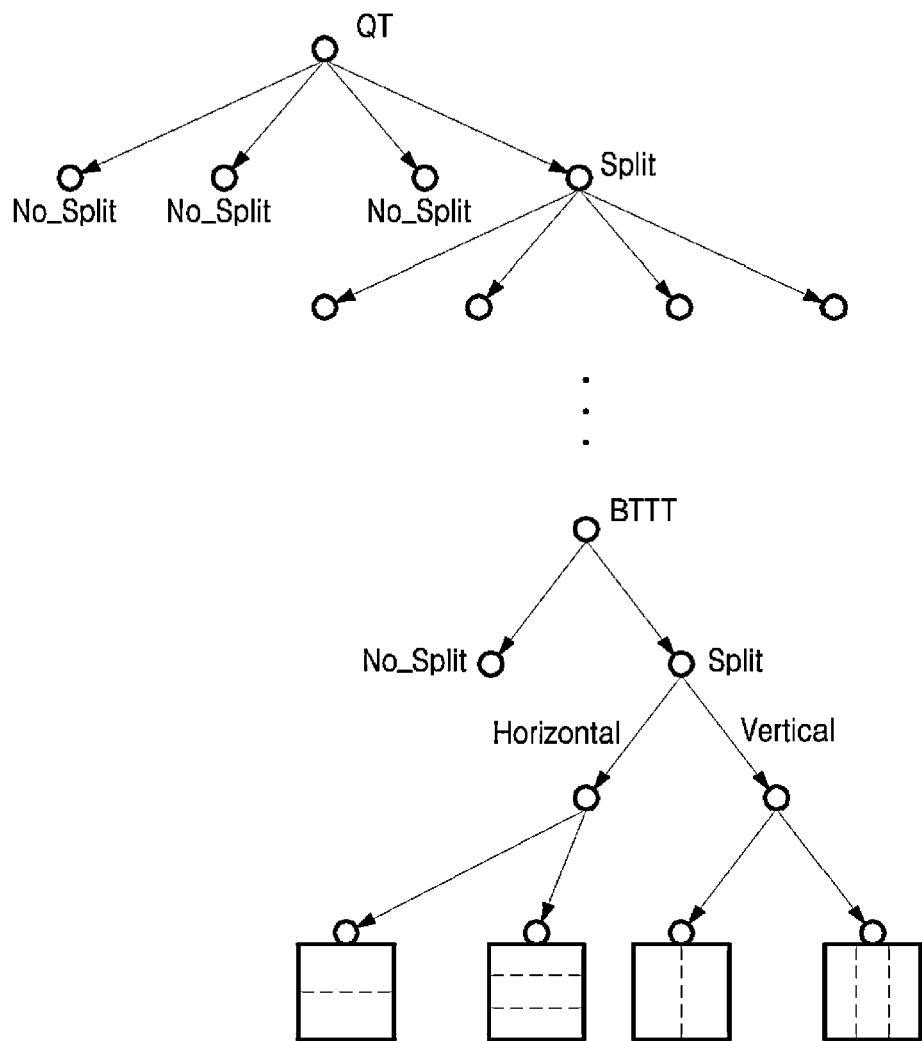
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block". As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
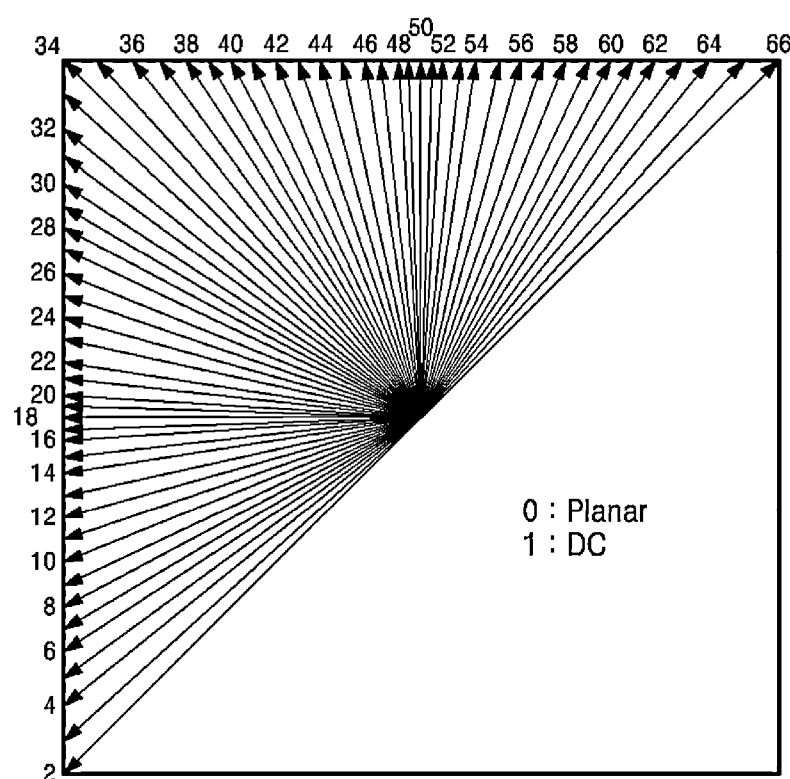
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
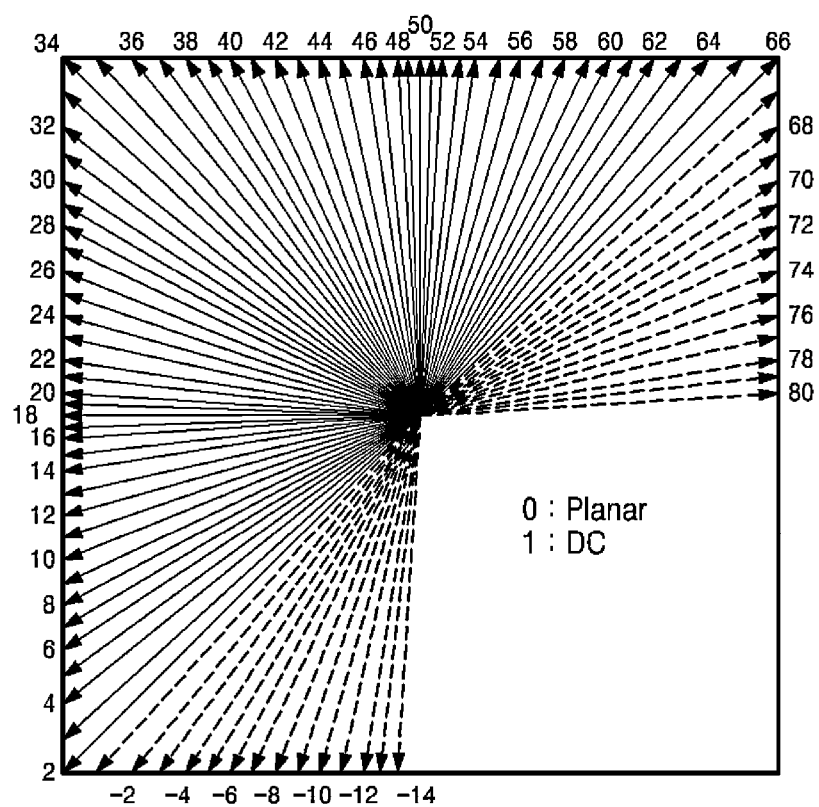

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, etc. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. Here, reference picture list 0 may be constituted by pictures before the current picture in a display order among pre-restored pictures, and reference picture list 1 may be constituted by pictures after the current picture in the display order among the pre-restored pictures. However, although not particularly limited thereto, the pre-restored pictures after the current picture in the display order may be additionally included in reference picture list 0. Inversely, the pre-restored pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
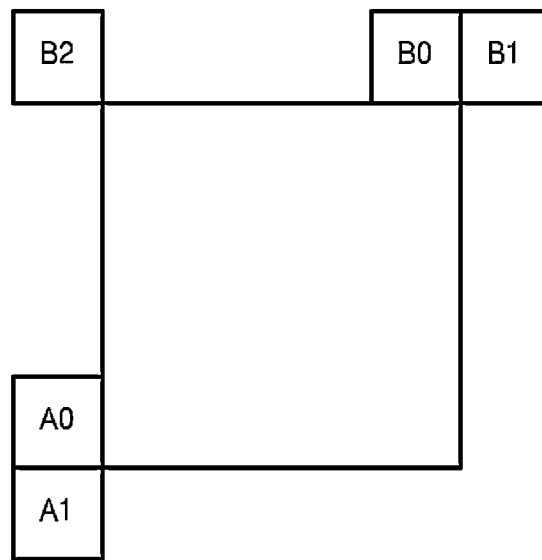
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, etc.) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to transform coefficients quantized arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to restore the residual block.

The adder 170 adds the restored residual block and the prediction block generated by the predictor 120 to restore the current block. Pixels in the restored current block may be used as reference pixels when intra-predicting a next-order block.

The loop filter unit 180 performs filtering for the restored pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the restored blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the restored pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The restored block filtered through the deblocking filter 182, the SAO filter 184, and the ALF 186 is stored in the memory 190. When all blocks in one picture are restored, the restored picture may be used as a reference picture for inter predicting a block within a picture to be encoded afterwards.

Figure 5:
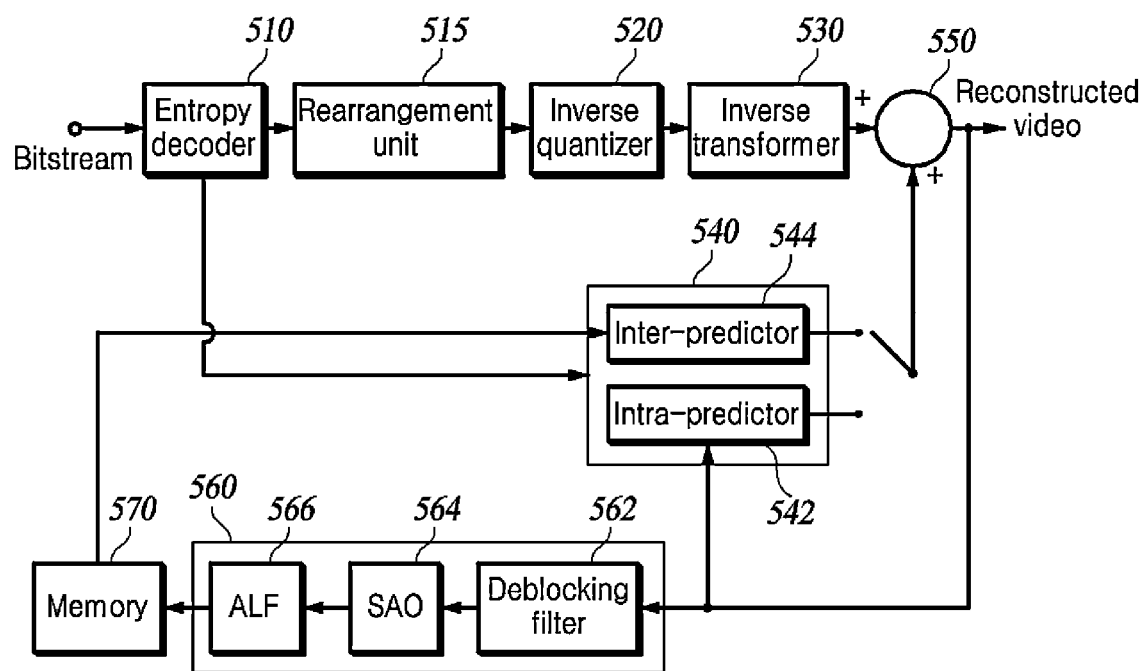
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT being further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to restore the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 restores the current block by adding the residual block output from the inverse transformer 530 and the prediction block output from the inter predictor 544 or the intra predictor 542. Pixels within the restored current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the restored blocks in order to remove the blocking artifact, which occurs due to block unit decoding. The SAO filter 564 and the ALF 566 perform additional filtering for the restored block after the deblocking filtering in order to compensate differences between the restored pixels and original pixels, which occur due to lossy coding. The filter coefficients of the ALF are determined by using information on filter coefficients decoded from the bitstream.

The restored block filtered through the deblocking filter 562, the SAO filter 564, and the ALF 566 is stored in the memory 570. When all blocks in one picture are restored, the restored picture may be used as a reference picture for inter predicting a block within a picture to be encoded afterwards.

The present disclosure in some embodiments relates to encoding and decoding video images as described above. More specifically, the present disclosure provides a video coding method and an apparatus using a deep learning-based in-loop filter for inter-predicting a P-frame and a B-frame in order to mitigate various levels of image distortion according to a quantization parameter (QP) values present in the P-frame and the B-frame.

The following embodiments may be applied commonly to the loop filter unit 180 in the video encoding apparatus and the loop filter unit 560 in the video decoding apparatus at portions utilizing the deep learning technology.

I. Hierarchical Encoding Structure

Figure 6:
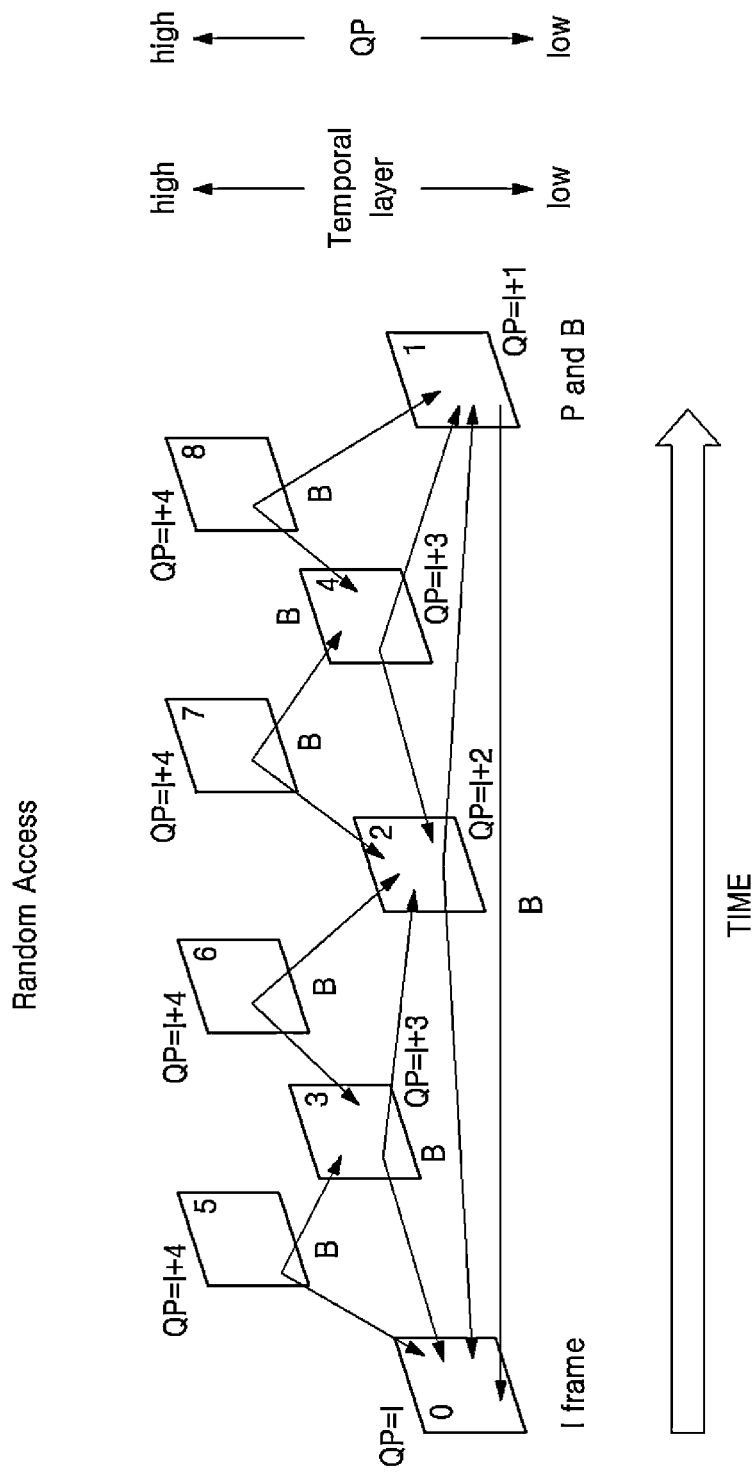
FIG. 6 is a diagram illustrating a hierarchical encoding structure according to random access (RA) mode.

FIG. 6 is a diagram illustrating a hierarchical encoding structure according to random access (RA) mode.

The video encoding apparatus, in random access mode, references both encoded and decoded pictures at earlier and later times relative to the current frame. In the hierarchical encoding structure in random access mode illustrated in FIG. 6, the size of the Group of Pictures (GOP) is 8. If the GOP is set to 16 or 32, the hierarchical encoding structure may vary accordingly, and the reference frame of the current frame to be encoded may be also variable.

In the example illustrated in FIG. 6, the numbers in the squares represent the encoding order. The video encoding apparatus encodes the I-frame (intra frame) first, and the I-frame is ranked zero. The video encoding apparatus then encodes the P-frame (predictive frame) with reference to the I-frame and then encodes the B-frame (bipredictive frame) between the I-frame and the P-frame. These three frames are encoded by using the quantization parameters QP=I, QP=I+1, and QP=I+2, respectively. These frames are represented as the lowest depth hierarchically and are denoted by Temporal layer ID=0.

The video encoding apparatus encodes frames that are located between frames included in the temporal layer ID=0. For example, a frame that is halfway between the 0th and 2nd encoded frames is encoded next. Additionally, the frame that is halfway between the 1st and 2nd encoded frames is encoded next. These frames are assigned Temporal layer ID=1. Frames corresponding to Temporal layer ID=1 are encoded by using the quantization parameter QP=I+3. Similarly, frames assigned Temporal layer ID=2 are encoded. Frames corresponding to Temporal ID=2 are encoded by using the quantization parameter QP=I+4.

Thus, as the temporal layer increases, the quantization parameter also increases. Namely, frames with lower temporal layers are compressed by using a lower quantization parameter to have a higher peak signal-to-noise ratio (PSNR) with higher video quality. On the other hand, frames that perform inter-prediction with reference to frames with lower temporal layers may be compressed to have a lower PSNR by using a relatively high quantization parameter.

Meanwhile, POC (Picture of Count) is an index that is assigned according to the temporal order in the GOP. Namely, the 0th frame through the 8th frame are assigned values POC=0 through POC=8 in order.

II. Video Compression Artifact Removal Network (VCARN)

VCARN stands for a deep learning-based denoising model that removes noise or artifacts caused by quantization noise during video compression. VCARN can be performed based on a convolutional neural network (CNN), similar to video denoising, which is the process of removing video noise. Unlike image denoising, video denoising can utilize previously coded frames to further improve denoising performance.

Figure 7:
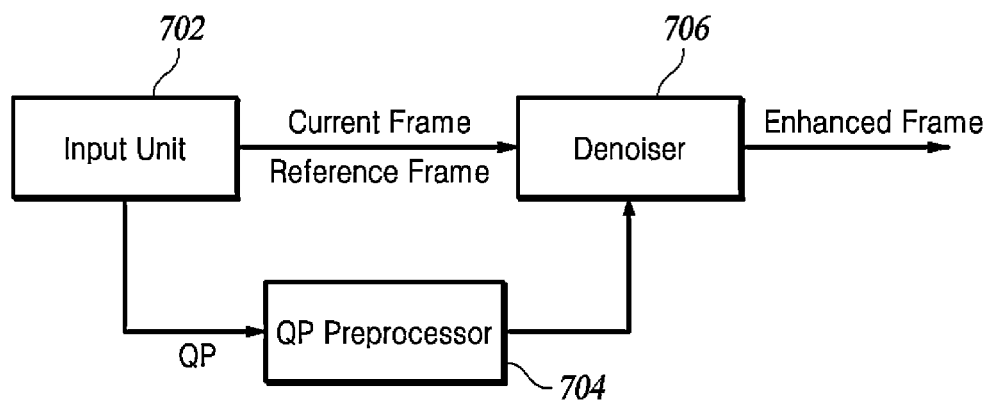
FIG. 7 is a diagram illustrating a video quality enhancement apparatus, according to at least one embodiment of the present disclosure.

FIG. 7 is a diagram illustrating a video quality enhancement apparatus, according to at least one embodiment of the present disclosure.

The video quality enhancement apparatus according to this embodiment may include all or part of an input unit 702, a quantization parameter (QP) preprocessor 704, and a denoiser 706. Such a video quality enhancement apparatus may be utilized as one of the in-loop filters within the loop filter unit 180 in the video encoding apparatus and the loop filter unit 560 in the video decoding apparatus. When included in the loop filter unit 180 in the video encoding apparatus, the components included in the video encoding apparatus according to the present embodiment are not necessarily limited to those illustrated. For example, the video encoding apparatus may be further equipped with a training unit (not shown) for training the deep learning model, included in the video quality enhancement apparatus, or the video encoding apparatus may be implemented in a configuration that interworks with an external training unit.

The input unit 702 obtains the current frame and the decoded QP. Here, the current frame may be a P-frame or a B-frame reconstructed according to the inter-prediction. Additionally, the input unit 702 may select a reference frame from a reference list, which is described in more detail below.

The QP preprocessor 704 calculates an embedding vector of the QP by using a deep learning-based embedding function or estimates an image distortion due to the QP by using a deep learning-based estimation model. The QP preprocessor 704 also transfers the embedding vector or the estimated image distortion to the denoiser 706.

The denoiser 706 utilizes a deep learning-based denoising model to generate a quality-enhanced frame from the current frame, i.e., the P/B-frame. The denoiser 706 may utilize an embedding vector or an estimated image distortion. When utilizing an embedding vector, the denoiser 706 may employ a conventional VCARN as a denoising model. Additionally, when using estimated image distortion, the denoiser 706 may use a normalization module as the denoising model to generate an enhanced image from the current frame.

As another example, the denoiser 706 may generate a similar frame from the reference frame by using VCARN and then may generate an enhanced frame by using the current frame and the similar frame. In generating the enhanced frame, the denoiser 706 may utilize the embedding vector.

Even within a single video sequence, the P/B-frames may contain varying levels of image distortion based on varying QP values. This embodiment provides an example of a VCARN that is adaptive to this environment, such that the enhanced signals can be even closer to the original signals.

Furthermore, VCARN may be divided into S-VCARN, which uses only a single current frame to remove quantization noise, and R-VCARN, which uses a reference frame.

The S-VCARN is a deep learning model f for improving the current frame $x_t$, which can be expressed as shown in Equation 1. The S-VCARN may be designed to behave adaptively to different quantization noises $qp_x$.

$$x_{hat,t,s} = f(x_t, qp_x) \quad \text{[Equation 1]}$$

Further, the R-VCARN is a deep learning model g for improving the current frame $x_t$ by utilizing a reference frame $x_r$, which can be expressed as shown in Equation 2. The following describes a method of selecting a reference frame $x_r$ and a method of generating a similar frame resulting from the reference frame approximating the current frame.

$$x_{hat,t,r} = g(x_t, x_r) \quad \text{[Equation 2]}$$

The R-VCARN may also be designed to operate on different quantization noises.

Alternatively, the two aforementioned models may be combined to make a combined VCARN. The combined VCARN may also be designed to operate on various quantization noises.

The S-VCARN, R-VCARN, and combined VCARN according to the present embodiments may be applied for improving the inter-prediction signal, may be applied for post-processing the compressed video signals to enhance the quality, and may be applied for improving the performance of the VCARN itself, besides the in-loop filter of the inter-predicted signals as described above.

On the other hand, conventional VCARNs have the following issues when used as an in-loop filter for inter-prediction signals.

VCARNs that utilize only the current frame may face the domain-shift issue, which is common to all deep learning-based techniques. The domain-shift issue is a phenomenon where if the probability distributions of the training samples and test samples are different, or if the training samples are not sufficiently generalized, then the performance of the resulting VCARN is degraded. For example, a VVC (Versatile Video Coding) with QPs ranging from 0 to 63 may require a VCARN trained on 63 environments, making it difficult to use a network trained on each QP. Therefore, VCARNs are required to use one or a small number of networks to process videos or video frames that are distorted by a wide variety of QPs. This diversity of QPs may be determined at the video sequence level or may occur based on temporal layers within a group of pictures (GOP).

Hereinafter, the term current frame and the term input video may be used interchangeably.

Figure 8A:
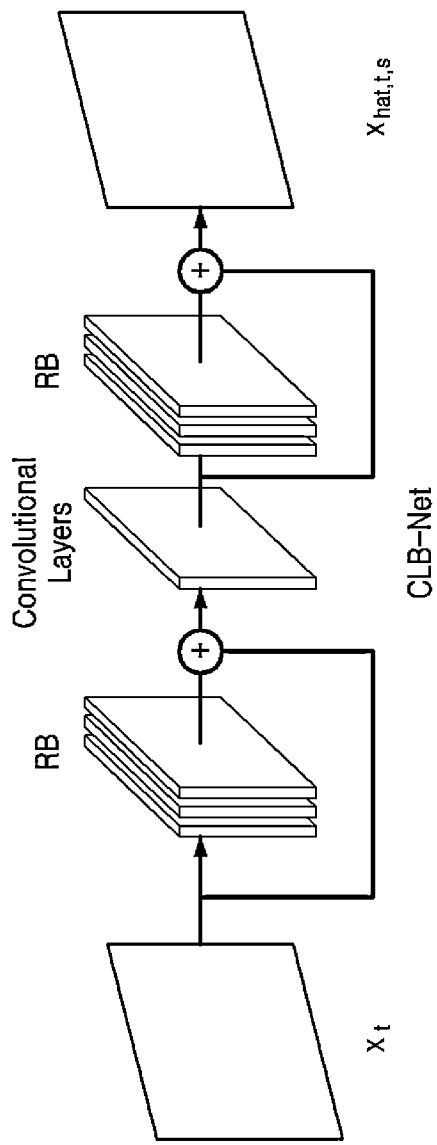
FIGS. 8A and 8B are diagrams illustrating an single-video compression artifact removal network (S-VCARN) utilizing a single network.
Figure 8B:
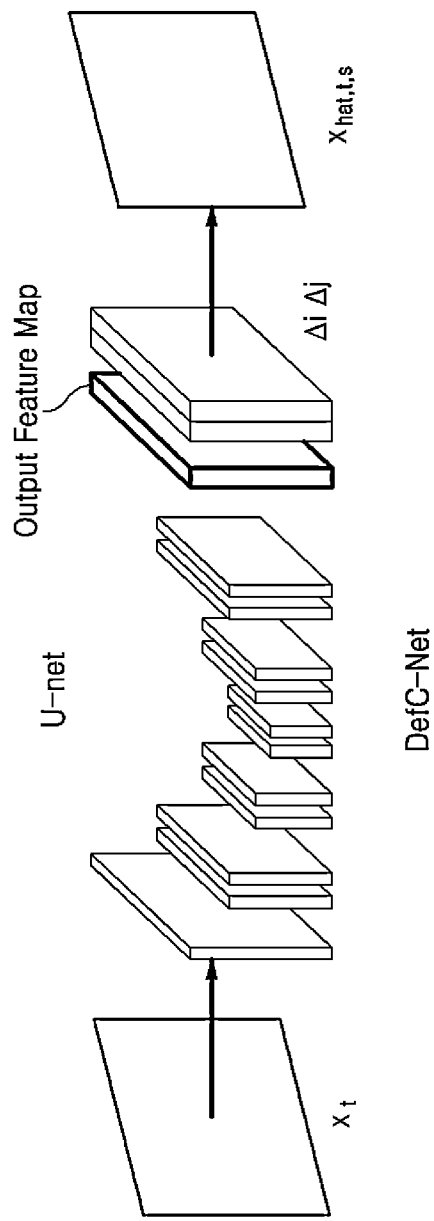

FIGS. 8A and 8B are diagrams illustrating an S-VCARN utilizing a single network.

The S-VCARN can utilize either a CLB-Net, which is a continuous stack of convolutional layer blocks, or a DefC-Net, which is a network with a deformable convolutional structure (see Learning Deformable Kernels for Image and Video Denoising, Learning Deformable Kernels for Image and Video Denoising, arxiv: 1904.06903), as the single network f.

The CLB-Net, as illustrated in FIG. 8A, may utilize a cascaded structure of residual blocks (RBs) and convolutional layers to output an enhanced image $x_{hat,t,s}$ of the current frame. Here, an RB is a convolutional block with a skip path between its input and output, which allows the convolutional block to output the residuals between its input and output.

The DefC-Net, as illustrated in FIG. 8B, generates offsets $\Delta i$ and $\Delta j$ of a kernel, from the input image by using an embedded deep learning model, U-net. A sampler in DefC-Net uses the generated offsets to sample the input image. Convolutional layers in DefC-Net generate a calibrated kernel, i.e., weights, from the input image, an output feature map of U-Net, and the sampled input image. Finally, an output convolutional layer in the DefC-Net may apply convolution to the sampled input image by using the calibrated kernel to output the input image with enhanced quality as the image $x_{hat,t,s}$. The illustration of FIG. 8B includes a portion that generates the offsets of the kernel by the U-Net, but does not include the sampler for sampling the input image, the convolutional layers for generating the calibrated kernel, and the output convolutional layer for generating the enhanced image.

For such an S-VCARN to be trained by the training unit, a loss function as shown in Equation 3 may be utilized.

$$MSE = \Sigma(y_t - x_{hat,t,s})^2 \quad \text{[Equation 3]}$$

Here, $y_t$ is the target video for training, i.e., the ground truth (GT).

VCARNs that utilize reference frames may suffer from performance degradation when the difference between the reference frame and the current frame is large. Typical factors that cause such a difference between the reference frame and the current frame are the temporal distance between the two frames and the different QPs of the two frames.

In the following description, the conventional S-VCARN is represented by the deep learning model f, as described above, and the conventional R-VCARN is represented by the deep learning model g, as described above. The video quality enhancement apparatus according to some embodiments of the present disclosure illustrates the enhancement of deep learning models f and g. In the illustration of FIG. 7 above, the VCARNs included in the input unit 702 and the QP preprocessor 704, and the denoiser 706 are described separately, although not so limited. In the following description, an enhanced VCARN may be described as including all or a portion of the input unit 702 and QP preprocessor 704.

III. Structure and Operation of S-VCARNs According to the Present Disclosure

Figure 9A:
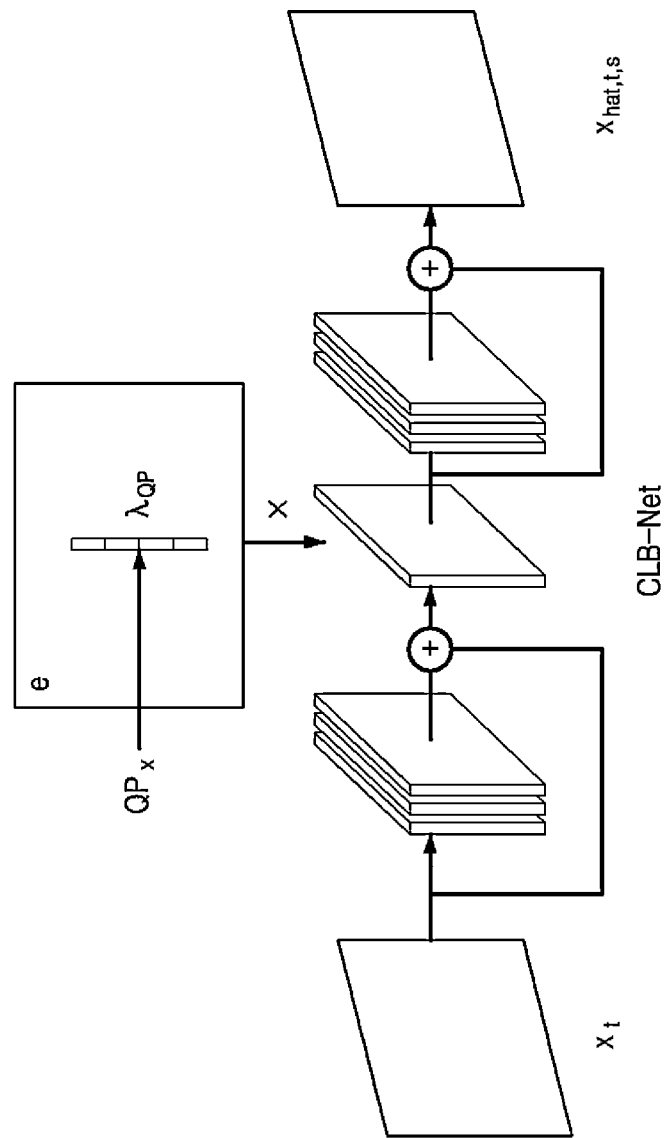
FIGS. 9A and 9B are diagrams illustrating an S-VCARN utilizing an embedding function, according to at least one embodiment of the present disclosure.
Figure 9B:
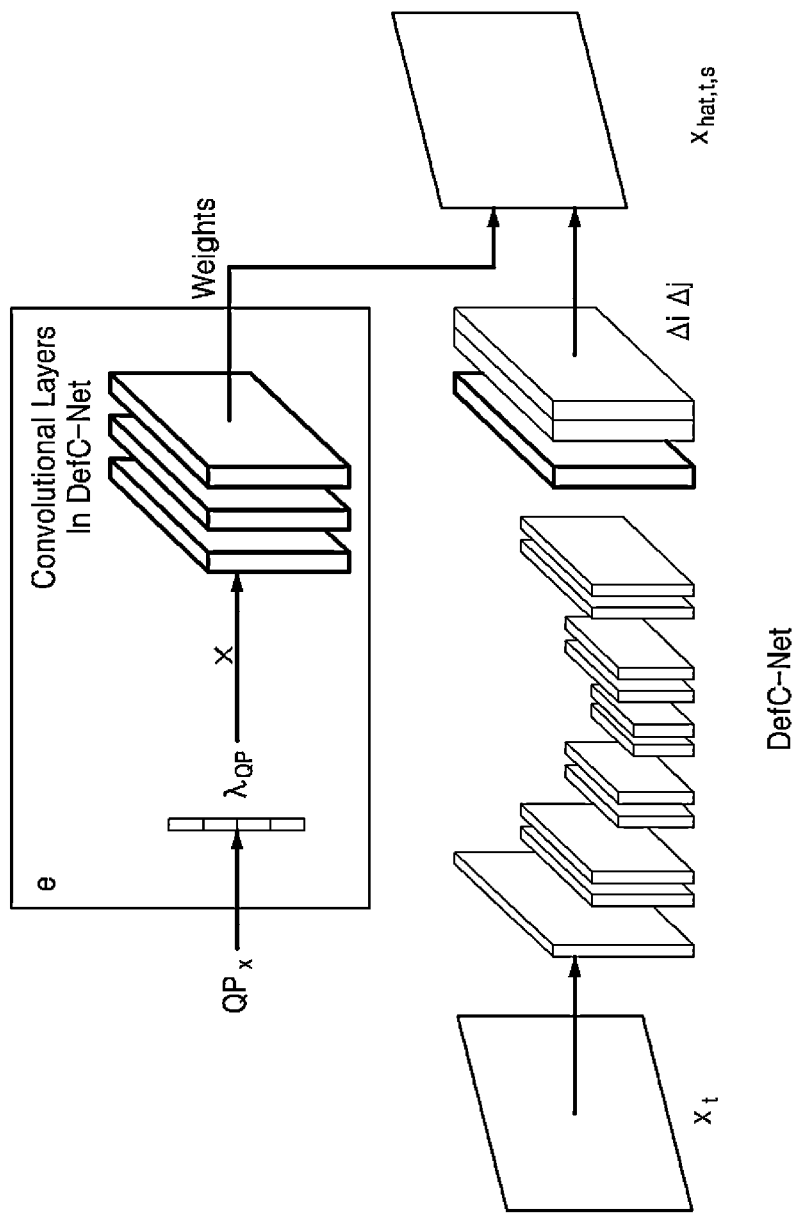

FIGS. 9A and 9B are diagrams illustrating an S-VCARN utilizing an embedding function, according to at least one embodiment of the present disclosure.

In at least one embodiment, the video quality enhancement apparatus may adaptively operate with different QPs by converting a QP value into an embedding vector and by applying the embedding vector to one of the convolutional layers in the S-VCARN. In other words, the QP preprocessor 704 may process the $QP_x$ corresponding to the current frame $x_t$, as shown in Equations 4 and 5, and may apply the embedding vector to the kth convolutional layer in the S-VCARN, where k is a natural number.

$$\lambda_{QP} = e(QP_x) \quad \text{[Equation 4]}$$

$$k_t = \text{Conv}(|\lambda_{QP}| \cdot k_t) \quad \text{[Equation 5]}$$

Here, e represents an embedding function, which is capable of learning and may be implemented as an embedding layer and multiple fully-connected layers. The embedding layer is the input layer that converts the quantization parameter into vector form, and the embedding function e finally produces an embedding vector corresponding to the quantization parameter. Also, Conv( ) is a network containing multiple convolutional layers, and $k_t$ denotes the feature of the kth convolutional layer. The S-VCARN may update the feature of the kth convolutional layer by multiplying the absolute value of the embedding vector $\lambda_{QP}$ generated according to Equation 4 by $k_t$ as shown in Equation 5. The updated feature may then be inputted to the (k+1)-th convolutional layer.

Based on Equation 4 and Equation 5, the S-VCARN including the aforementioned CLB-net may be operated, as illustrated in FIG. 9A, such that the value of $k_t$ may be adaptively changed based on the QP value.

As another example, the S-VCARN may change based on the utilization of the embedding vector. For the CLB-net, the S-VCARN may be changed by multiplying all the features of the convolutional layers by the common absolute value of the embedding vector $\lambda_{QP}$. Alternatively, for the CLB-net, the S-VCARN may be modified by multiplying the last layer of the last RB by the absolute value of the embedding vector $\lambda_{QP}$.

As another example, for the DefC-net, S-VCARN may be modified by multiplying all or some of the convolutional layers that generate the calibrated kernel, i.e., the weights, by the absolute value of the embedding vector $\lambda_{QP}$, as illustrated in FIG. 9B. Alternatively, for the DefC-net, S-VCARN can be modified to apply Equation 5 to the calibrated kernel so that the output calibrated kernel is generated differently depending on the QP.

In accordance with Equation 4, the QP preprocessor 704 may use, but is not necessarily limited to, the QP exclusively as an input to the embedding function to compensate for quantization noise levels. As another example, the QP preprocessor 704 may utilize, as input to the embedding function, one or a combination of the QP, a Lagrange multiplier for calculating rate distortion, a temporal layer within the GOP, and a type of frame (P-frame or B-frame).

Figure 10A:
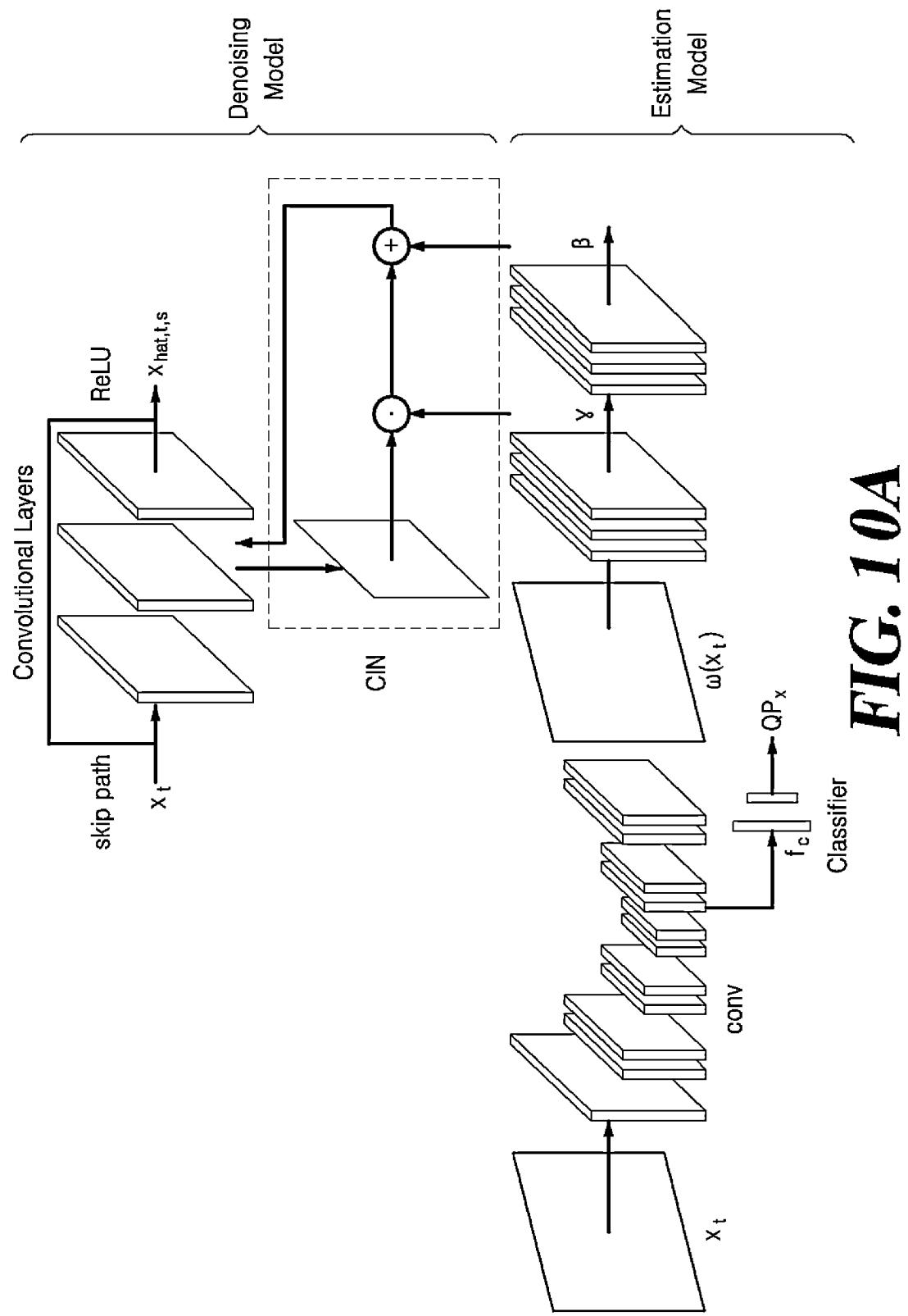
FIGS. 10A and 10B are diagrams illustrating an S-VCARN using quantized noise estimation, according to another embodiment of the present disclosure.
Figure 10B:
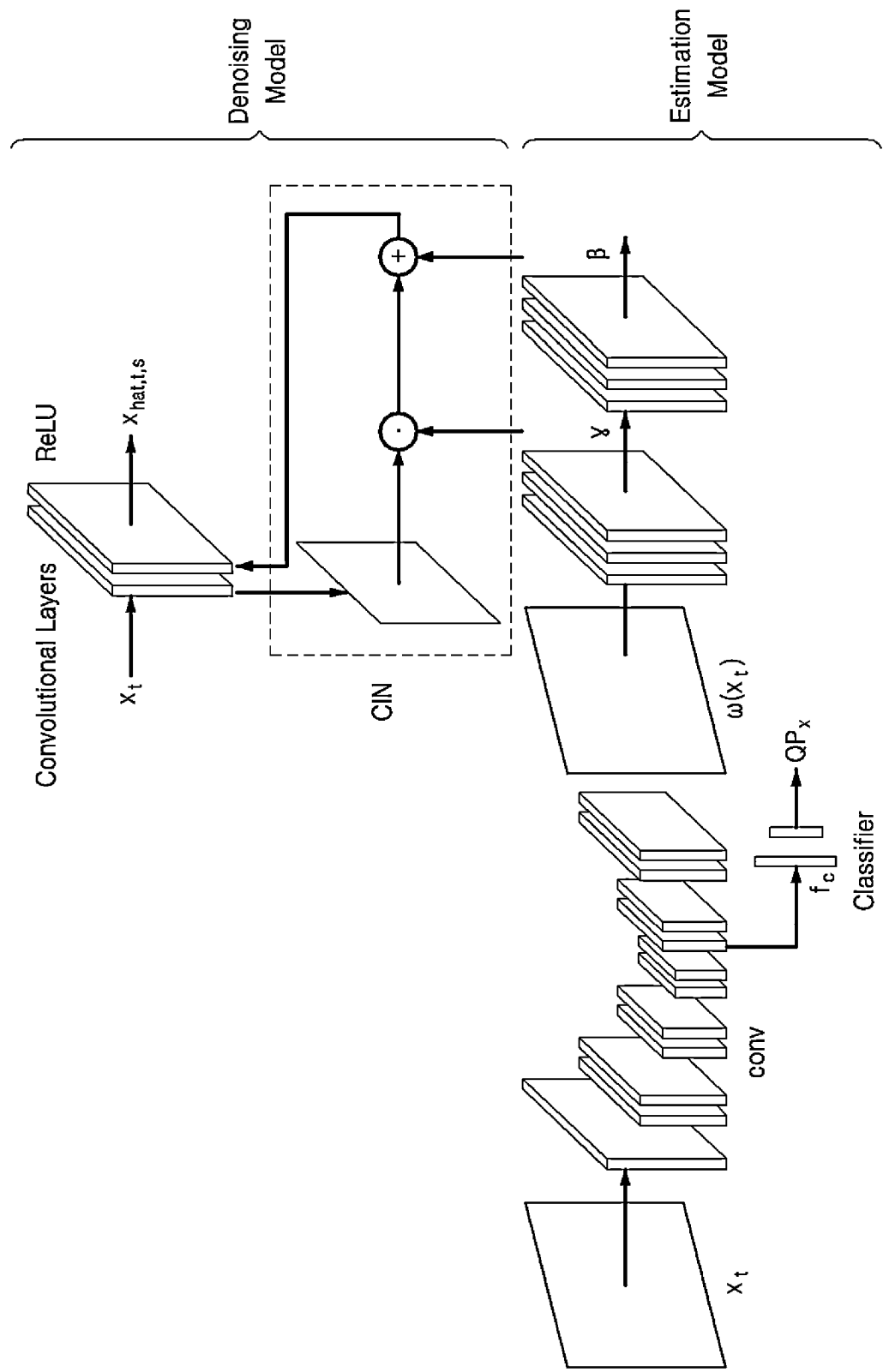

FIGS. 10A and 10B are diagrams illustrating an S-VCARN using quantized noise estimation, in accordance with other embodiments of the present disclosure.

In another embodiment, the video quality enhancement apparatus may adjust the feature of the convolutional layer to adapt to the distortion of the input image, by using conditional instance normalization (CIN) that is a normalization module for correcting for the degree of distortion, added to the backbone network, which is a deep learning-based estimation model. In other words, the denoiser 706 may use the estimated input image distortion directly for distortion correction, rather than the QP.

The QP preprocessor 704 estimates the distortion of the input image by using an estimation model, as illustrated in FIGS. 10A and 10B. Additionally, the denoiser 706 normalizes the feature of the convolutional layer by using a normalization module, CIN. The normalization operation of the CIN may be expressed by Equation 6.

$$CIN(x) = \gamma\left(\frac{x - \mu(x)}{\sigma(x)}\right) + \beta \quad \text{[Equation 6]}$$

In Equation 6, $\mu(x)$ denotes the mean of x and $\sigma(x)$ denotes the standard deviation of x. Additionally, $\gamma$ and $\beta$ denote the affine matrix that is capable of learning. In Equation 6, x may be a feature of the convolutional layer, which in this embodiment may be the input image $x_t$.

The QP preprocessor 704 may generate normalization parameters $\gamma$ and $\beta$ that reflect image distortion as follows. First, the QP preprocessor 704 extracts a noise map $\omega(x_t)$ from the input image $x_t$ by using a backbone network h. Here, the backbone network may be a U-net-based neural network. To estimate the degree of distortion caused by QP when generating the noise map $\omega(x_t)$, a classifier is added for classifying the quantization parameter $QP_x$ of the input image. The backbone network performs the prediction of the quantization parameter values by connecting the feature before undergoing up-convolution in the U-net structure to the classifier. Based on this predicted $QP_x$, the backbone network may extract the feature such that an appropriate noise map $\omega(x_t)$ is generated for the input image $x_t$. In the illustration of FIGS. 10A and 10B, the classifier $F_C$ represents the full-connection layer.

Meanwhile, a loss function for predicting quantization parameter values may be defined by using cross-entropy, as shown in Equation 7.

$$CE = -\sum_{i}^{C} QP_i(\text{Classifier}(\text{Unet\_down}(x_t))) \quad \text{[Equation 7]}$$

In Equation 7, C is the number of classifiable quantization parameters and Unet_down($x_t$) represents the feature before undergoing up-convolution in the U-net structure.

The QP preprocessor 704 extracts the normalization parameters $\gamma$ and $\beta$ from $\omega(x_t)$ by using additional convolutional layers. The estimation model includes a backbone network, a classifier, and convolutional layers that generate $\gamma$ and $\beta$.

Finally, using Equation 6 including these components, the denoiser 706 may apply CIN to the input image $x_t$, as illustrated in FIGS. 10A and 10B. The denoising model within the denoiser 706 includes a CIN and an output convolutional layer. For example, in the example of FIG. 10A, the denoising model applies the normalization module, CIN, to the convolutional network that includes a skip path. Namely, CIN is applied to the residuals between the input image and the enhanced image. The denoising model applies convolution and an activation function to the normalized residuals to generate the enhanced image.

On the other hand, in the example of FIG. 10B, the denoising model applies CIN directly to the input image and then applies the convolution and the activation function applicable to the normalized image to generate the enhanced image, where the activation function represented by Rectified Linear Unit (ReLU) is connected to the output of the convolutional layer as illustrated in FIGS. 10A and 10B.

Meanwhile, the entire network, including the denoising model and the estimation model, is trained end-to-end, and the loss function may be expressed as shown in Equation 8.

$$\text{Loss} = MSE + \alpha \cdot CE \quad \text{[Equation 8]}$$

In Equation 8, MSE is the loss associated with the image enhancement of the estimation model and the denoising model and CE is the loss associated with the prediction of the quantization parameter of the classifier, as shown in Equation 7. Further, $\alpha$ is a hyperparameter that controls the coupling ratio between MSE and CE.

As mentioned above, when an enhanced frame is generated from a single current frame by using conventional S-VCARN, the prediction results may be different by depending on QP due to the domain shift issue. To improve this issue, the input frame and enhanced frame may be blended adaptive to the QP.

Figure 11:
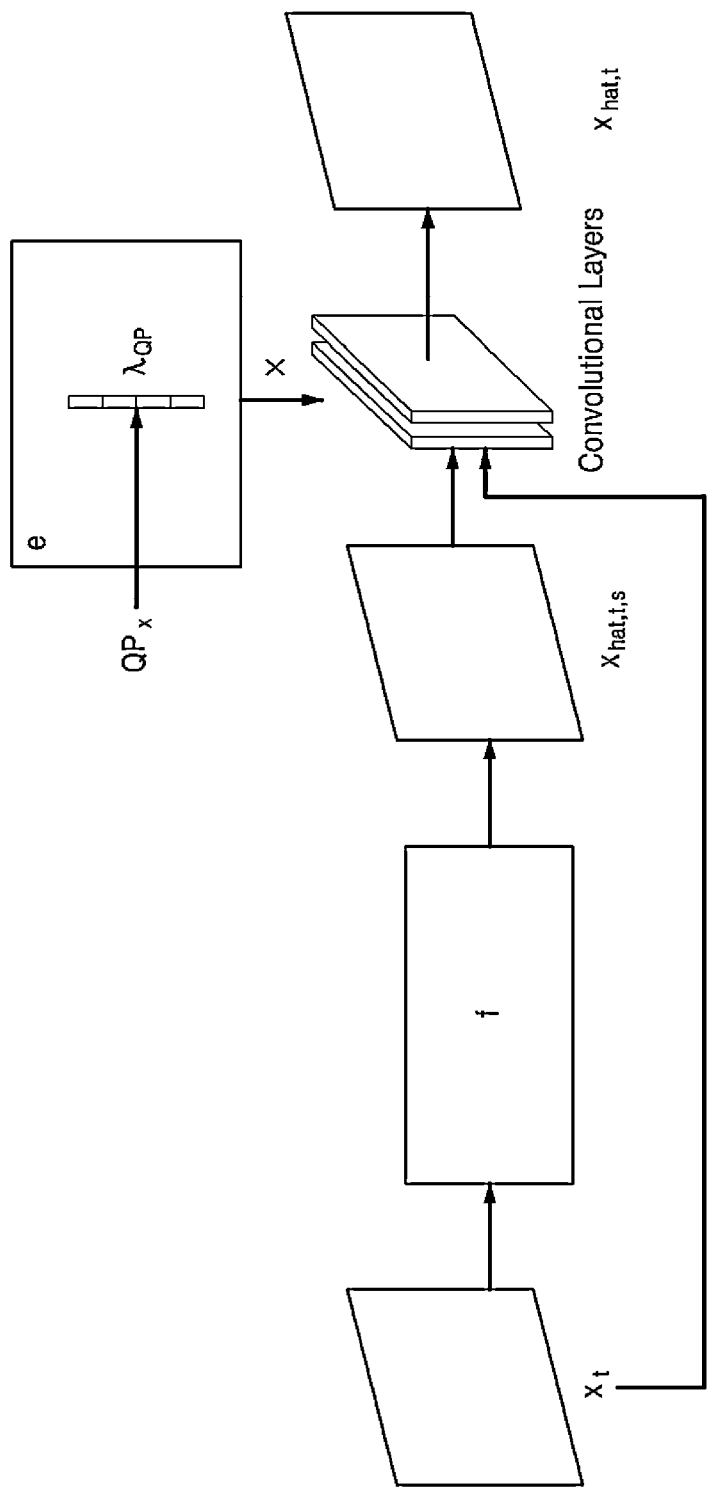
FIG. 11 is a diagram illustrating an S-VCARN using a mask map, according to yet another embodiment of the present disclosure.

FIG. 11 is a diagram illustrating an S-VCARN using a mask map, according to yet another embodiment of the present disclosure.

In yet another embodiment, as illustrated in FIG. 11, the S-VCARN may include a plurality of convolutional layers that take $x_t$ and $x_{hat,t,s}$ as inputs. Also, $x_t$ is the already decoded reconstructed frame and $x_{hat,t,s}$ is the frame generated by a conventional S-VCARN f.

As shown in Equation 9, by using the embedding vector $\lambda_{QP}$ of the QP, and the residual network CNN( ), the S-VCARN may generate and add enhanced residual signals to $x_{hat,t,s}$ to generate the final enhanced frame $x_{hat,t}$.

$$x_{hat,t} = |\lambda_{QP}| \cdot CNN([x_t, x_{hat,t,s}]) + x_{hat,t,s} \quad \text{[Equation 9]}$$

Alternatively, as shown in Equation 10, the S-VCARN may calculate a mask map m t and then may use the mask map to select regions to reflect from each of the input image and the enhanced frame.

$$m_t = |\lambda_{QP}| \cdot CNN([x_t, x_{hat,t,s}])$$

$$x_{hat,t} = m_t \cdot x_t + (1 - m_t) \cdot x_{hat,t,s} \quad \text{[Equation 10]}$$

The reason for using the mask map is that even if the input image is passed through the conventional S-VCARN f, as discussed above, the input image does not necessarily produce optimal enhanced signals. In the example of FIG. 11, the network represented by the convolutional layers may perform the process as shown in Equation 9 and Equation 10. In this case, the lower the QP, the more the input image $x_t$ is reflected in the final enhanced signals $x_{hat,t}$, and the higher the QP, the more the frame $x_{hat,t,s}$ enhanced by the conventional S-VCARN f can be reflected.

IV. Structure and Operation of R-VCARN According to the Present Disclosure

The following describes a method of improving the performance of a conventional R-VCARN g according to the present disclosure. First, the input unit 702 may select a reference frame $x_r$ utilized by the R-VCARN as follows.

The frame with the lowest temporal layer in the reference list may be selected as the reference frame $x_r$.

Alternatively, the frame with the lowest QP in the reference list may be selected as the reference frame $x_r$.

Alternatively, the frame with the smallest picture of count (POC) difference from the current frame in the reference list may be selected as the reference frame $x_r$.

Alternatively, the reference frame $x_r$ may be selected by using an algorithm for selecting a peak quality frame (PQF) (see Ren Yang, Mai Xu, Zulin Wang, Tianyi Li, Multi-Frame Quality Enhancement for Compressed Video, CVPR 2018, arxiv: 1803.04680).

If more than one reference frames exist satisfying the aforementioned conditions, the frame positioned earlier in the display order may be selected as the reference frame $x_r$.

Alternatively, if more than one reference frame exists satisfying the aforementioned conditions, all of the frames that satisfy the conditions may be selected as reference frame $x_r$.

Figure 12A:
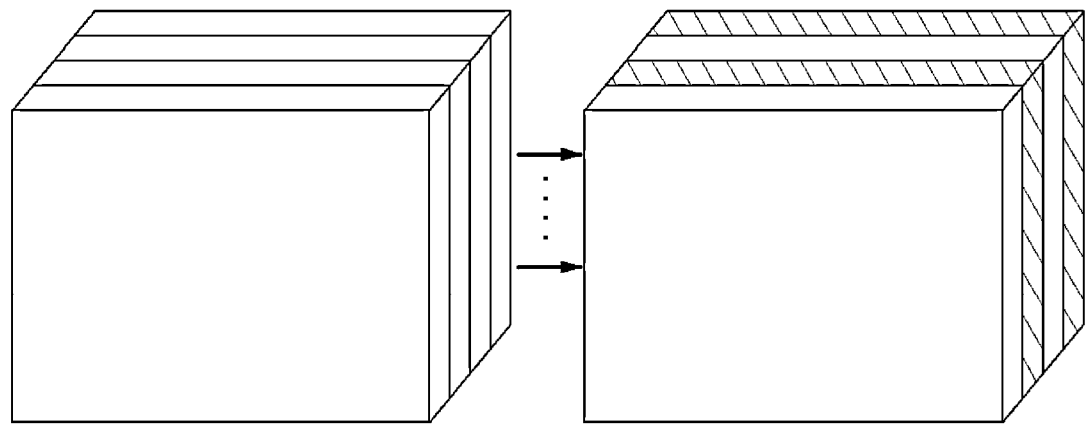
FIGS. 12A and 12B are diagrams illustrating a shift in a reference frame, according to at least one embodiment of the present disclosure.
Figure 12B:
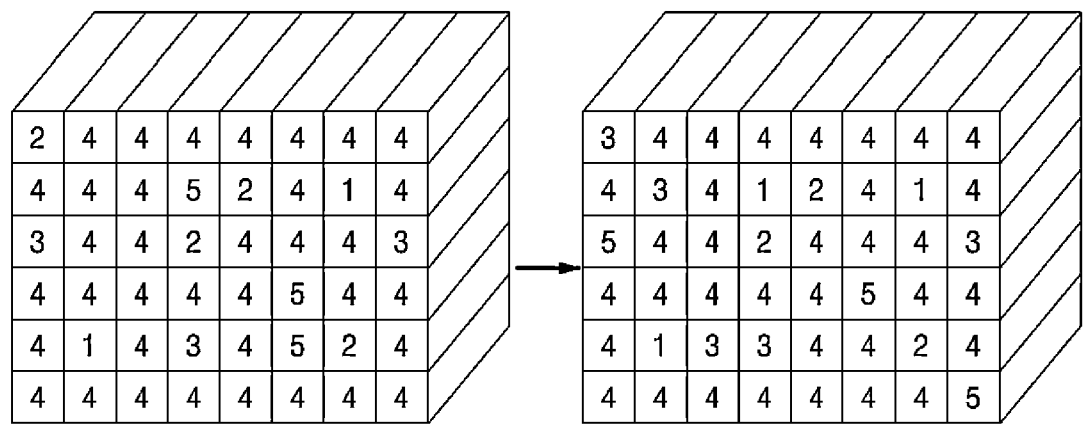

FIGS. 12A and 12B are diagrams illustrating a shift in a reference frame, according to at least one embodiment of the present disclosure.

The R-VCARN then shifts the selected reference frame to be similar to the current frame. In one example, a similar frame may be generated by shifting the reference frame in the pixel domain, as shown in Equation 11.

$$x_{hat,r \to t} = \text{warp}(x_r; x_t) \quad \text{[Equation 11]}$$

Here, the warping may be performed using an optical flow calculated based on the reference frame or may be performed using a DefC-net as described above.

As another example, a pseudo-frame may be generated by shifting the reference frame in the feature domain, as shown in Equation 12.

$$x_{hat,r \to t} = \text{warp}(\text{ConvNet}(x_r); \text{ConvNet}(x_t)) \quad \text{[Equation 12]}$$

Here, ConvNet( ) is a network for extracting a feature from the reference frame or the current frame. Warping may be performed for each channel of the extracted feature, as illustrated in FIG. 12A, by calculating and then using an optical flow on a per channel of the feature. Alternatively, warping may be performed by selecting and moving vectors that are most similar to the spatial portion, as exemplified in FIG. 12B. Namely, vectors may be selected and moved based on coordinates in space. On the other hand, warping based on shifting in the spatial portion may be performed using a texture transformer (see Fuzhi Yang, Huan Yang, Jianlong Fu, Hongtao Lu, Baining Guo, Learning Texture Transformer Network for Image Super-Resolution, CVPR 2020, arxiv: 2006.04139).

By combining the reference frame selection method described above with the reference frame shift method, an enhanced R-VCARN may be generated.

Figure 13A:
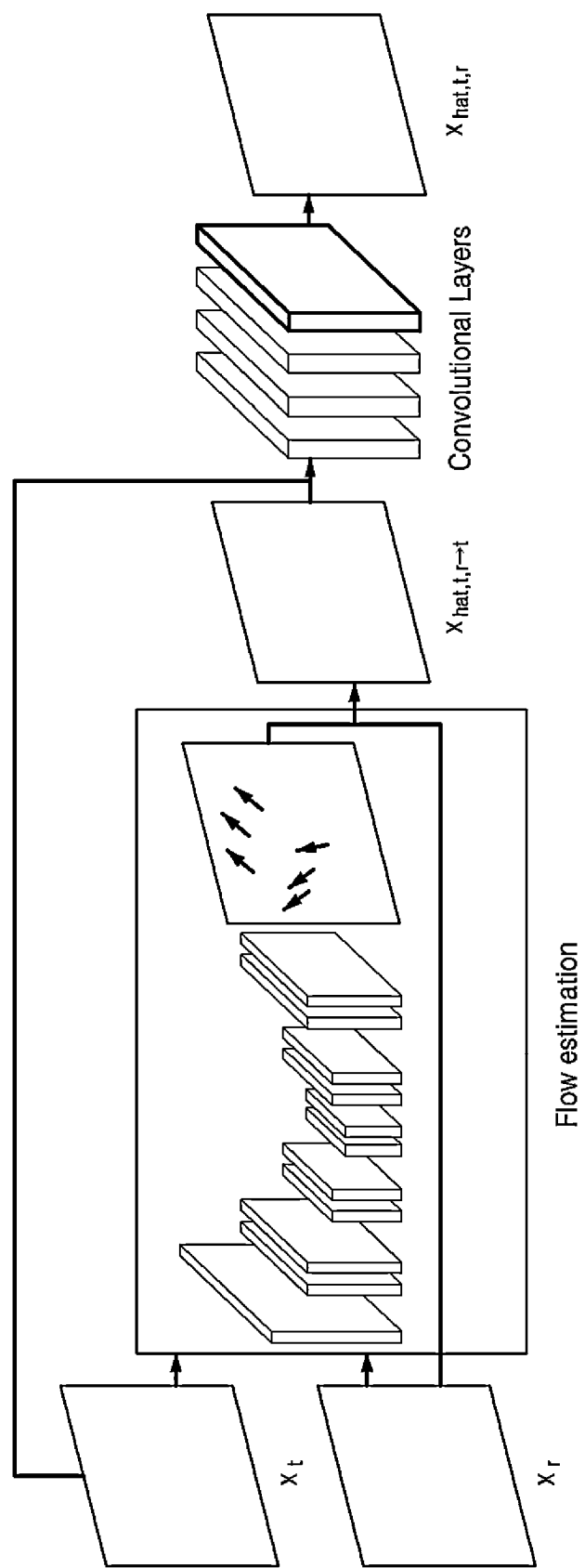
FIGS. 13A and 13B are diagrams illustrating an reference-video compression artifact removal network (R-VCARN), according to at least one embodiment of the present disclosure.
Figure 13B:
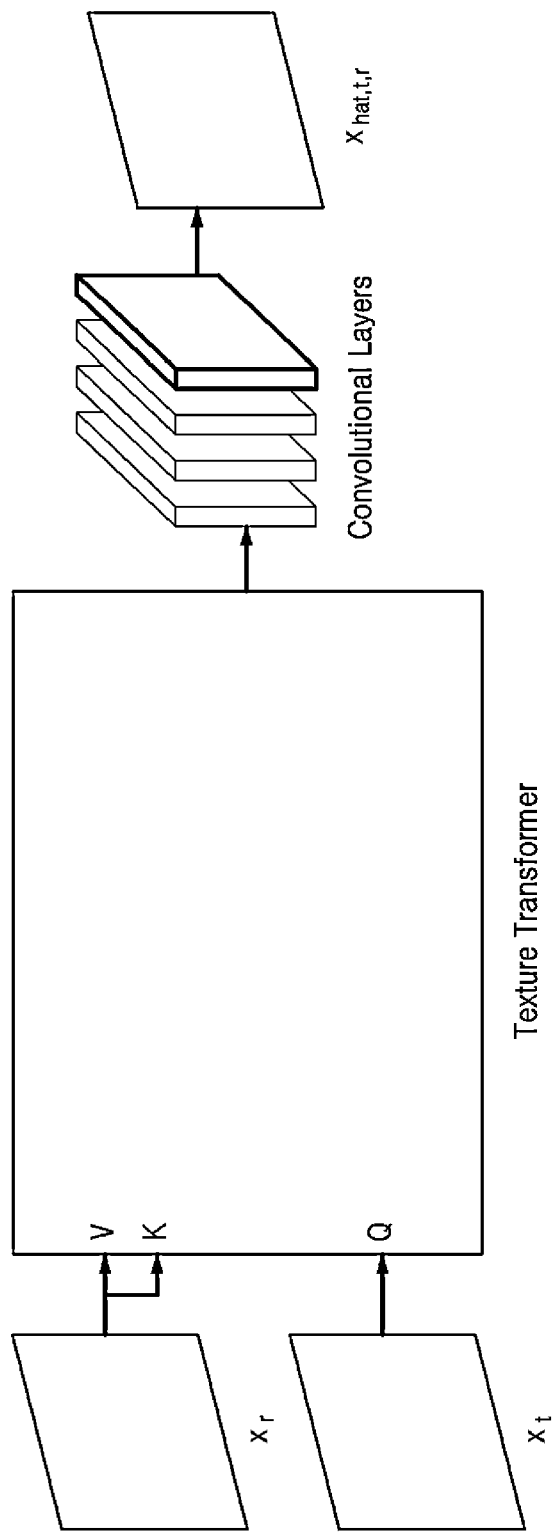

FIGS. 13A and 13B are diagrams illustrating an R-VCARN, according to at least one embodiment of the present disclosure.

In the example of FIG. 13A, R-VCARN selects a reference frame $x_r$ and predicts an optical flow such that $x_r$ becomes similar to $x_t$. The R-VCARN may use the optical flow to shift $x_r$ in the pixel domain to generate a similar frame $x_{hat,r \to t}$, and then may use $x_{hat,r \to t}$ and $x_t$ as input to generate an enhanced frame $x_{hat,t,r}$. At this time, R-VCARN may utilize convolutional layers to combine the $x_t$ frame and $x_{hat,t,r}$ frame. Meanwhile, the R-VCARN may be trained by the training unit to make $x_{hat,t,r}$ similar to the ground truth, GT $y_t$.

On the other hand, in the example of FIG. 13B, the R-VCARN selects and shifts a reference frame $x_r$ in the feature domain. In other words, after the respective features for $x_t$ and $x_r$ is extracted, the R-VCARN calculates the relationship between the two features and recombines the feature of $x_r$ to be similar to the feature of $x_t$.

To recombine the feature of $x_r$, the R-VCARN may be implemented as a texture transformer, as shown in the example of FIG. 13B. The texture transformer may recombine the feature of the $x_r$ by using an attention function. The attention function takes, as input, Q, K, and V, which represent the query matrix, key matrix, and value matrix, respectively. By inputting the feature of the current frame $x_t$ into Q and the feature of the reference frame $x_r$ into K and V to operate the attention function, the R-VCARN may calculate the relationship between the features of $x_t$ and $x_r$ and thus recombine the feature of $x_r$.

The R-VCARN may then combine the recombined feature with the feature of $x_t$ to generate an enhanced frame $x_{hat,t,r}$. In the process, the R-VCARN may utilize convolutional layers to combine the $x_t$ frame and $x_{hat,t,r}$ frame. Meanwhile, the R-VCARN may be trained by the training unit to make $x_{hat,t,r}$ similar to GT $y_t$.

In another embodiment, the R-VCARN may be adaptively trained to reflect the QP value. In this case, to reflect the distortion caused by the QP in the R-VCARN, the methods applied to the S-VCARN may be utilized, such as using an embedding function according to Equation 4, using a CIN according to Equation 6 and using a mask map according to Equation 10.

Figure 14:
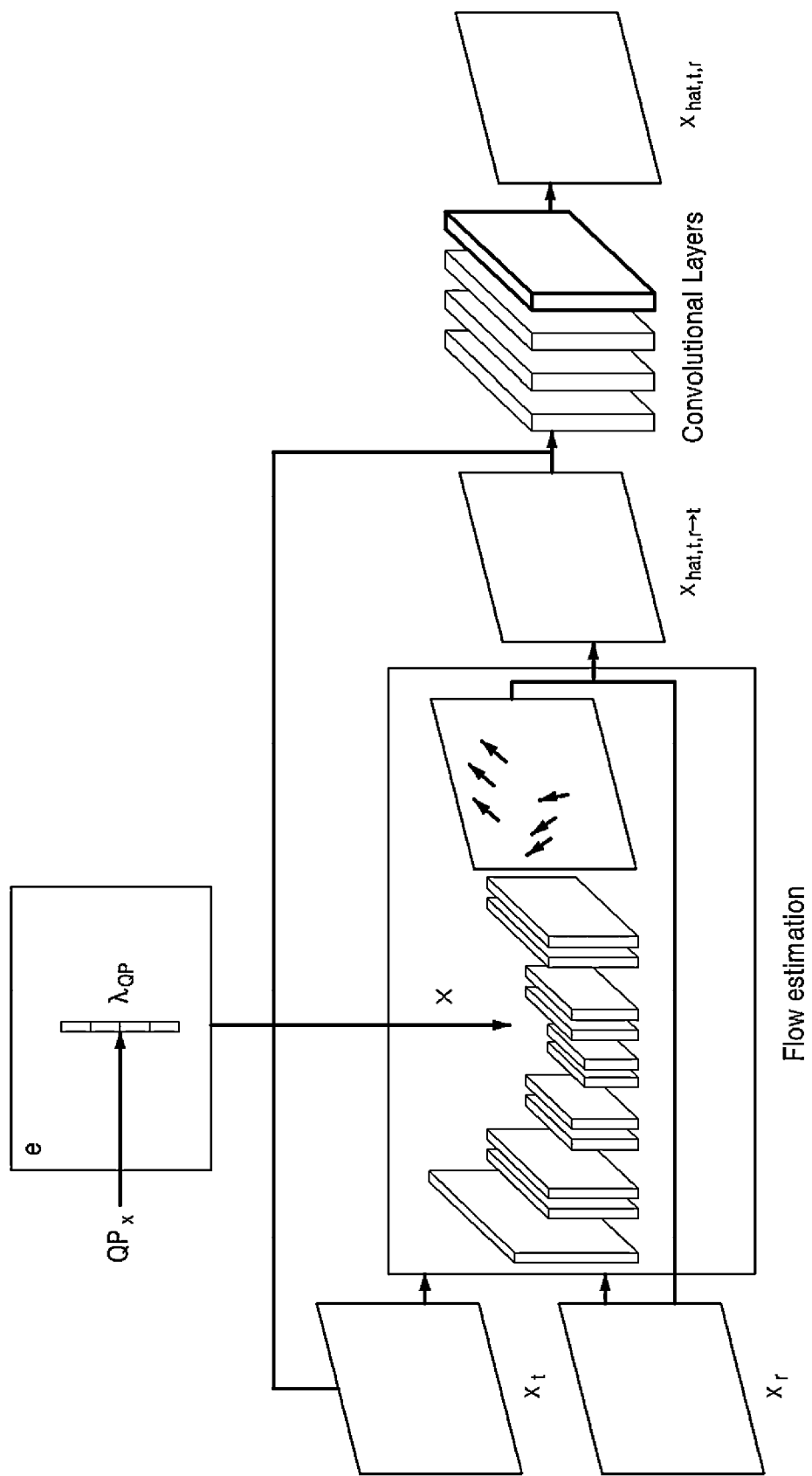
FIG. 14 is a diagram illustrating an R-VCARN utilizing an embedding function, according to another embodiment of the present disclosure.

FIG. 14 is a diagram illustrating an R-VCARN utilizing an embedding function, according to another embodiment of the present disclosure.

For example, as illustrated in FIG. 14, an R-VCARN utilizing a shift in the pixel domain may reflect the QP value by using an embedding function according to Equation 5.

In other words, the R-VCARN may input an embedding vector generated from the QP value into any convolutional layer in the network that performs in-loop filtering.

In another embodiment, a combined VCARN may be implemented by combining an S-VCARN and an R-VCARN.

Figure 15:
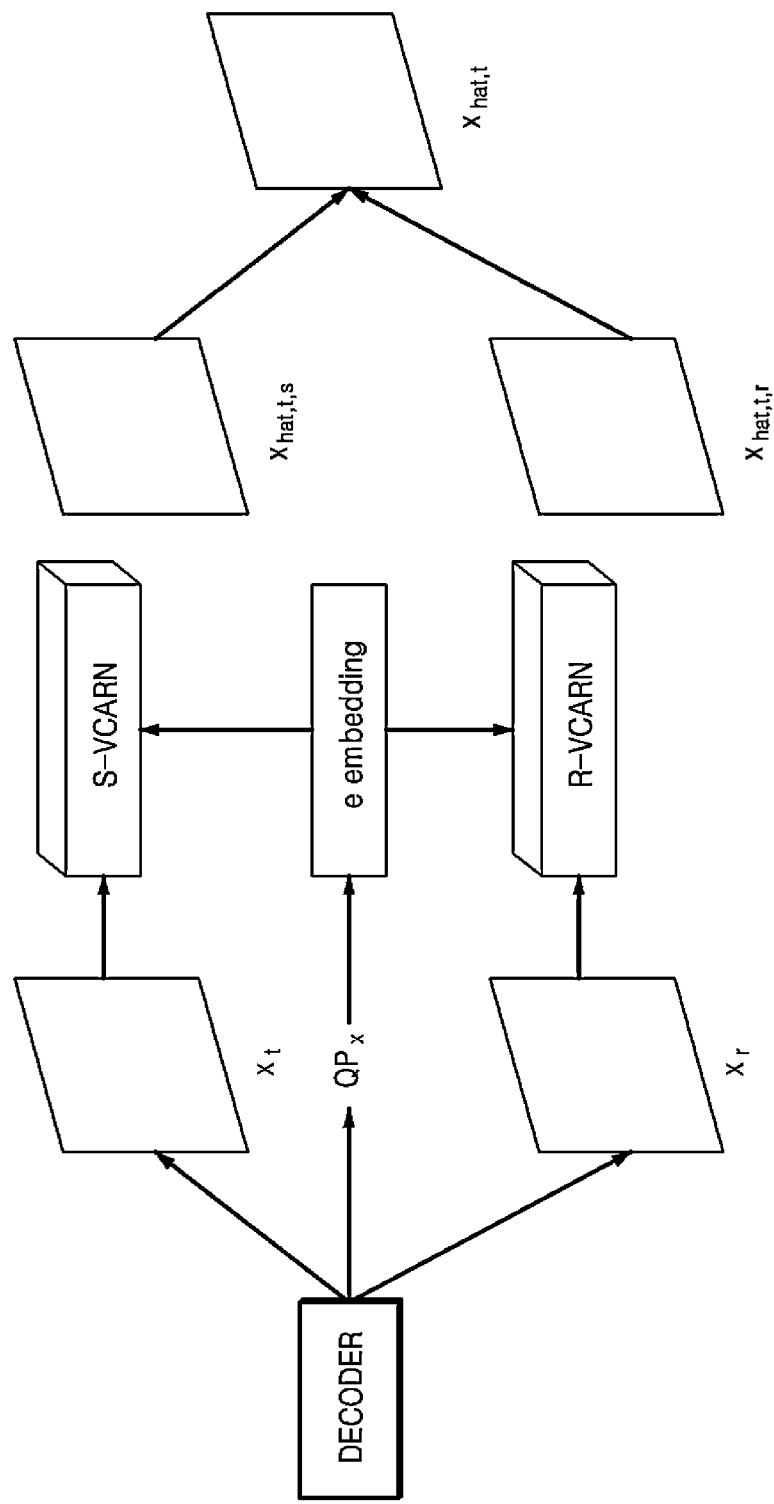
FIG. 15 is an illustrative diagram of a combined VCARN by combining an S-VCARN and an R-VCARN.

FIG. 15 is an illustrative diagram of a combined VCARN by combining an S-VCARN and an R-VCARN.

The combined VCARN may combine the $x_{hat,t,s}$ frame predicted using S-VCARN and the $x_{hat,t,r}$ frame predicted using R-VCARN to generate a final $x_{hat,t}$ frame, as illustrated in FIG. 15. To combine the $x_{hat,t,s}$ frame and $x_{hat,t,r}$ frame, the combined VCARN may use several convolutional layers or a mask.

Figure 16:
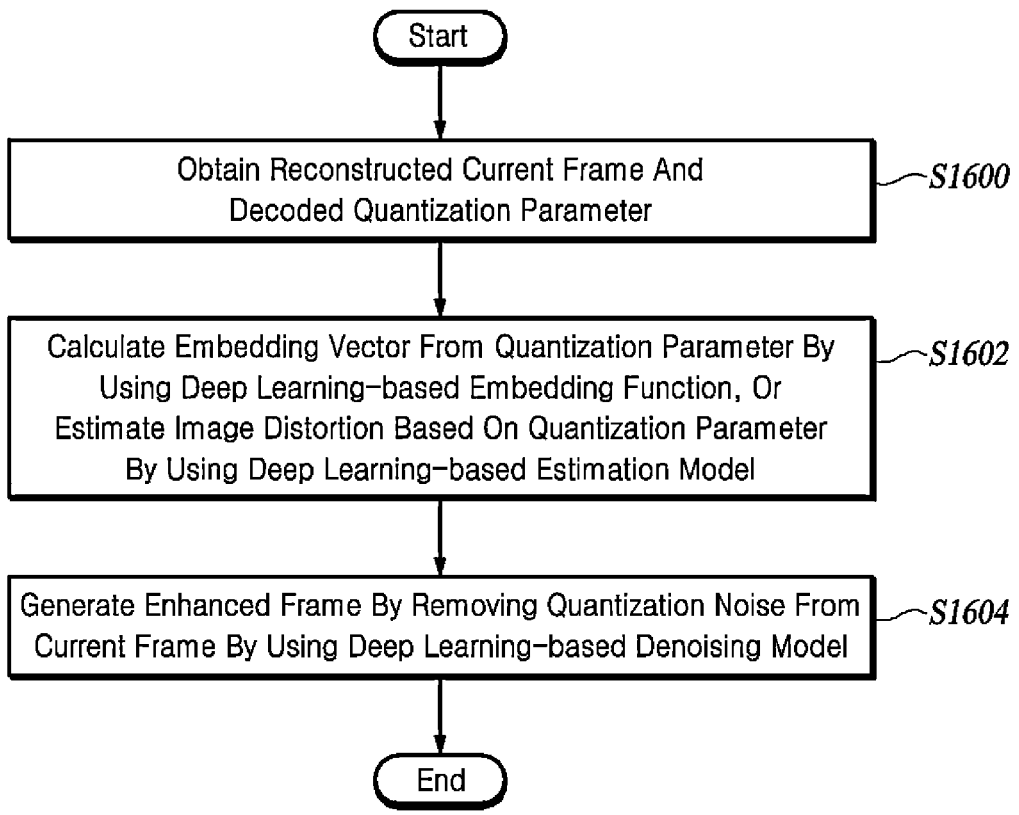
FIG. 16 is a flowchart of a video quality enhancement method utilizing S-VCARN, according to at least one embodiment of the present disclosure.
Figure 17:
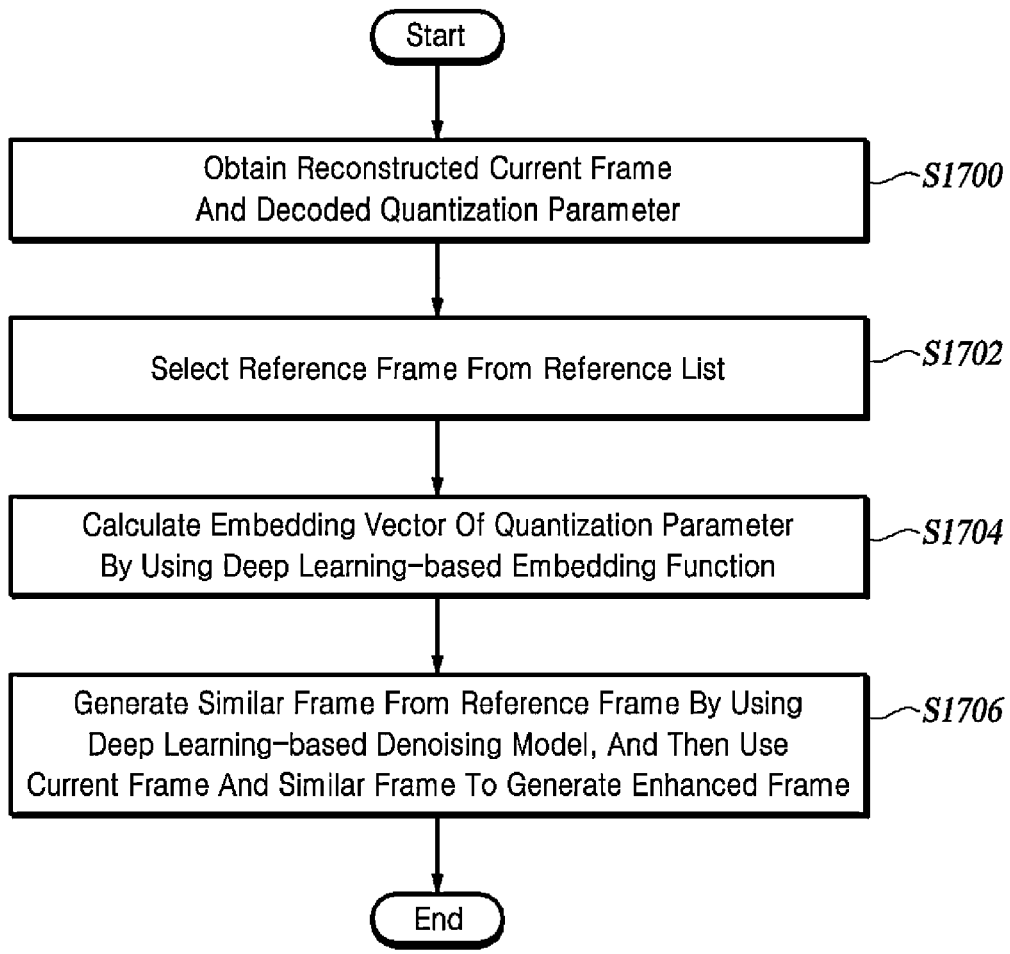
FIG. 17 is a flowchart of a video quality enhancement method utilizing R-VCARN, according to at least one embodiment of the present disclosure.

The following refers to FIGS. 16 and 17 for describing video quality enhancement methods performed by the video quality enhancement apparatus.

As described above, the video quality enhancement method may be performed by the loop filter unit 180 in the video encoding apparatus and the loop filter unit 560 in the video decoding apparatus.

FIG. 16 is a flowchart of a video quality enhancement method utilizing S-VCARN, according to at least one embodiment of the present disclosure.

The video quality enhancement apparatus obtains the reconstructed current frame and the decoded quantization parameter (S1600). Here, the current frame may be a P-frame or a B-frame reconstructed based on an inter-prediction of the video coding apparatus.

The video quality enhancement apparatus calculates an embedding vector from the quantization parameter by using a deep learning-based embedding function or estimates an image distortion based on the quantization parameter by using a deep learning-based estimation model (S1602).

The embedding function includes an embedding layer and a plurality of fully-connected layers. The embedding layer is an input layer for converting the quantization parameter into vector form, and the embedding function ultimately generates an embedding vector corresponding to the quantization parameter.

Further, the embedding function may take, as input, one or a combination of the quantization parameter, the Lagrange multiplier used to calculate the rate distortion, the temporal layer within the GOP, and the type of frame (P-frame or B-frame).

The estimation model may include a U-net for extracting a noise map from the current frame, may include a classifier for predicting a quantization parameter from the feature before undergoing up-convolution in the U-net structure, and may include convolutional layers for extracting, from the noise map, normalization parameters representing image distortion.

The video quality enhancement apparatus generates an enhanced frame by removing quantization noise from the current frame by using a deep learning-based denoising model (S1604).

In one example, the denoising model, which is an S-VCARN, is a CLB-net including a cascaded structure of RBs and convolutional layers, and the cascaded structure may be utilized to generate the enhanced frame. Each RB is a convolutional block with a skip path between its input and output. This denoising model may be changed to generate an enhanced frame by multiplying the feature generated by a present one of the convolutional layers by the absolute value of the embedding vector. Alternatively, the denoising model may be changed by multiplying every feature of the convolutional layers by a common absolute value of the embedding vector. Alternatively, the denoising model may be changed by multiplying the last layer of the last RB by the absolute value of the embedding vector.

As another example, the denoising model may be a DefC-Net that includes convolutional layers for generating a calibrated kernel. Such a denoising model may be changed by multiplying the feature produced by preset one of the convolutional layers by the absolute value of the embedding vector. Alternatively, the denoising model may be changed by multiplying the calibrated kernel by the absolute value of the embedding vector.

When using an estimation model, the denoising model may include a normalization module for normalizing the current frame by using normalization parameters and an output convolutional layer for generating an enhanced frame from the normalized current frame. The estimation model and the denoising model may be trained end-to-end. The loss function of such end-to-end training may be expressed as the sum of (1) the losses for the estimation model and the denoising model to estimate the enhanced frame and (2) the losses for the classifier to predict the quantization parameter, as shown in Equation 8.

As another example, the denoising model may further include convolutional layers and may use the convolutional layers to blend the current frame with the enhanced frame adaptive to a quantization parameter. For example, the absolute value of the embedding vector and the convolutional layers may be used to generate residual signals between the current frame and the enhanced frame, and the denoising model may then add the residual signals to the enhanced frame to generate a final enhanced frame.

Alternatively, after utilizing the absolute value of the embedding vector and the convolutional layers to calculate a mask map for the current frame and the enhanced frame, the denoising model may use the mask map to combine the current frame and the enhanced frame.

FIG. 17 is a flowchart of a video quality enhancement method utilizing R-VCARN, according to at least one embodiment of the present disclosure.

The video quality enhancement apparatus obtains a current frame and a decoded quantization parameter (S1700). Here, the current frame may be a P-frame or a B-frame that has been reconstructed according to an inter-prediction of the video coding apparatus.

The video quality enhancement apparatus selects a reference frame from the reference list (S1702). The video quality enhancement apparatus may select a frame with the lowest temporal layer in the reference list as the reference frame or may select a frame with the lowest quantization parameter in the reference list as the reference frame.

The video quality enhancement apparatus calculates an embedding vector of the quantization parameter by using a deep learning-based embedding function (S1704).

As described above, the embedding function includes an embedding layer and a plurality of fully-connected layers. The embedding layer is an input layer for converting the quantization parameter into vector form, and the embedding function ultimately generates an embedding vector corresponding to the quantization parameter.

The video quality enhancement apparatus generates a similar frame from the reference frame by using a deep learning-based denoising model and then uses the current frame and the similar frame to generate an enhanced frame (S1706).

In one example, the denoising model shifts the reference frame in the pixel domain. The denoising model may predict an optical flow from the reference frame and may use the optical flow to generate a similar frame from the reference frame.

As another example, the denoising model may shift the reference frame in the feature domain. The denoising model may extract the features of the current frame and the reference frame respectively and may use the feature of the current frame and the feature of the reference frame to recombine the feature of the reference frame in the feature domain. The denoising model may combine the recombined feature of the reference frame with the feature of the current frame to generate a similar frame.

The video quality enhancement apparatus may utilize the embedding vector in the process of generating the enhanced frame. For example, the denoising model may be modified by multiplying the feature generated by a preset one of the convolutional layers in the denoising model, by the embedding vector.

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure should not be limited by the above explicitly described embodiments but by the claims and equivalents thereof.

| (Reference Numerals) | |
|---|---|
| 180: loop filter unit | 560: loop filter unit |
| 702: input unit | 704: quantization parameter (QP) preprocessor |
| 706: denoiser | |

What is claimed is:

1. A method for filtering an image area performed by a video decoding device, the method comprising:
   obtaining an image area having been reconstructed and a quantization parameter of the image area;
   generating an embedding vector based on the quantization parameter and a prediction type of the image area; and
   generating a filtered image area of the image area based on the embedding vector by using a denoising model that is based on deep learning,
   wherein the prediction type of the image area indicates one of an intra prediction type in which the image area is predicted independently, a predictive type in which the image area is predicted based on a reference image area in a single direction, or a bi-predictive type in which the image area is predicted based on at least one reference image area in bi-directions.

2. The method of claim 1, wherein the image area is a predictive frame (P-frame) or a bipredictive frame (B-frame) reconstructed according to an inter-prediction.

3. The method of claim 1, wherein generating the embedding vector includes:
   generating the embedding vector using embedding function including an embedding layer and a plurality of fully-connected layers.

4. The method of claim 3, wherein the embedding function takes as input all or part of the quantization parameter, a Lagrange multiplier for calculating rate distortion, a temporal layer of the image area, a type of the image area, or any combination thereof.

5. The method of claim 1, wherein
   the denoising model includes a cascaded structure of residual blocks (RBs) and convolutional layers and uses the cascaded structure to generate the filtered image area, and
   each RB is a convolutional block having a skip path between an input and an output.

6. The method of claim 5, wherein generating the filtered image area includes multiplying a feature generated by a preset convolutional layer among the convolutional layers by an absolute value of the embedding vector.

7. The method of claim 1, wherein the denoising model includes:
   a U-net that is a deep learning model configured to generate an offset of a kernel from the image area;
   a sampler configured to sample the image area by using the offset;
   convolutional layers configured to generate a calibrated kernel from the image area, an output feature map of the U-net, and a sampled image area; and
   an output convolutional layer configured to apply convolution to the sampled image area by using the calibrated kernel to generate the filtered image area.

8. The method of claim 7, wherein generating the filtered image area includes multiplying the calibrated kernel by an absolute value of the embedding vector.

9. The method of claim 1, wherein
   the denoising model further includes combinatorial convolutional layers,
   the denoising model generates residual signals between the image area and the filtered image area by using an absolute value of the embedding vector and the combinatorial convolutional layers, and
   the denoising model sums the residual signals and the filtered image area.

10. A method performed by a video encoding device for filtering an image area, the method comprising:
    obtaining an image area having been reconstructed and a quantization parameter of the image area;
    generating an embedding vector based on the quantization parameter and a prediction type of the image area; and
    generating a filtered image area based on the embedding vector by using a denoising model that is based on deep learning,
    wherein the prediction type of the image area indicates one of an intra prediction type in which the image area is predicted independently, a predictive type in which the image area is predicted based on a reference image area in a single direction, or a bi-predictive type in which the image area is predicted based on at least one reference image area in bi-directions.

11. The method of claim 10, wherein obtaining the image area and the quantization parameter comprises:

obtaining as the image area a predictive frame (P-frame) or a bipredictive frame (B-frame) reconstructed according to an inter-prediction.

12. The method of claim 10, wherein generating the embedding vector includes:
   generating the embedding vector using embedding function including an embedding layer and a plurality of fully-connected layers.

13. The method of claim 10, wherein
the denoising model includes a cascaded structure of residual blocks (RBs) and convolutional layers and uses the cascaded structure to generate the filtered image area, and
each RB is a convolutional block having a skip path between an input and an output.

14. The method of claim 13, wherein generating the filtered image area comprises:
   multiplying a feature generated by a preset convolutional layer among the convolutional layers by an absolute value of the embedding vector.

15. A method of storing a bitstream of a video into a non-transitory computer-readable recording medium, wherein the bitstream is generated by a video encoding method, and the video encoding method comprises:
   obtaining an image area having been reconstructed and a quantization parameter of the image area;
   generating an embedding vector based on the quantization parameter and a prediction type of the image area; and
   generating a filtered image area based on the embedding vector by using a denoising model that is based on deep learning,
   wherein the prediction type of the image area indicates one of an intra prediction type in which the image area is predicted independently, a predictive type in which the image area is predicted based on a reference image area in a single direction, or a bi-predictive type in which the image area is predicted based on at least one reference image area in bi-directions.

* * * * *